(12) United States Patent
Gill

(10) Patent No.: US 7,048,003 B2
(45) Date of Patent: May 23, 2006

(54) POLYVALVE

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 0 days.

(21) Appl. No.: 11/194,306

(22) Filed: Jul. 31, 2005

(65) Prior Publication Data

US 2006/0021662 A1    Feb. 2, 2006

Related U.S. Application Data

(60) Provisional application No. 60/592,975, filed on Jul. 31, 2004.

(51) Int. Cl.
*F16K 11/22* (2006.01)
*F16K 7/17* (2006.01)

(52) U.S. Cl. .................. 137/601.13; 251/45; 251/61.1

(58) Field of Classification Search ........... 137/601.13, 137/859, 512.1; 251/61.1, 45
See application file for complete search history.

(56) References Cited

U.S. PATENT DOCUMENTS

| | | | | |
|---|---|---|---|---|
| 3,727,623 A | * | 4/1973 | Robbins | 137/1 |
| 4,019,533 A | * | 4/1977 | Jerde et al. | 137/599.07 |
| 4,284,260 A | * | 8/1981 | Baranoff | 251/45 |
| 4,659,062 A | * | 4/1987 | Mooney | 251/61.1 |
| 4,967,793 A | * | 11/1990 | Gill | 137/557 |
| 6,834,675 B1 | * | 12/2004 | Gill | 137/625.32 |

* cited by examiner

*Primary Examiner*—Stephen M. Hepperle

(57) ABSTRACT

A flow control and pressure reducing valve having a polygonic valve body with an inlet chamber and an outlet chamber partitioned by a partition plate. A plurality of passages are formed through receptacles around the partition plate, with the inlet portion opening into the inlet chamber and the outlet portion opening into the outlet chamber. Elastomeric flow control means having the shape of flat hat are positioned inside the receptacles to block the passage of fluid when charged with pressurized fluid, and to unblock the passage of fluid when the pressurized fluid is discharged from said flow control means.

12 Claims, 2 Drawing Sheets

SECTION 1-1

SECTION 1-1

POLYVALVE

Figure 1:
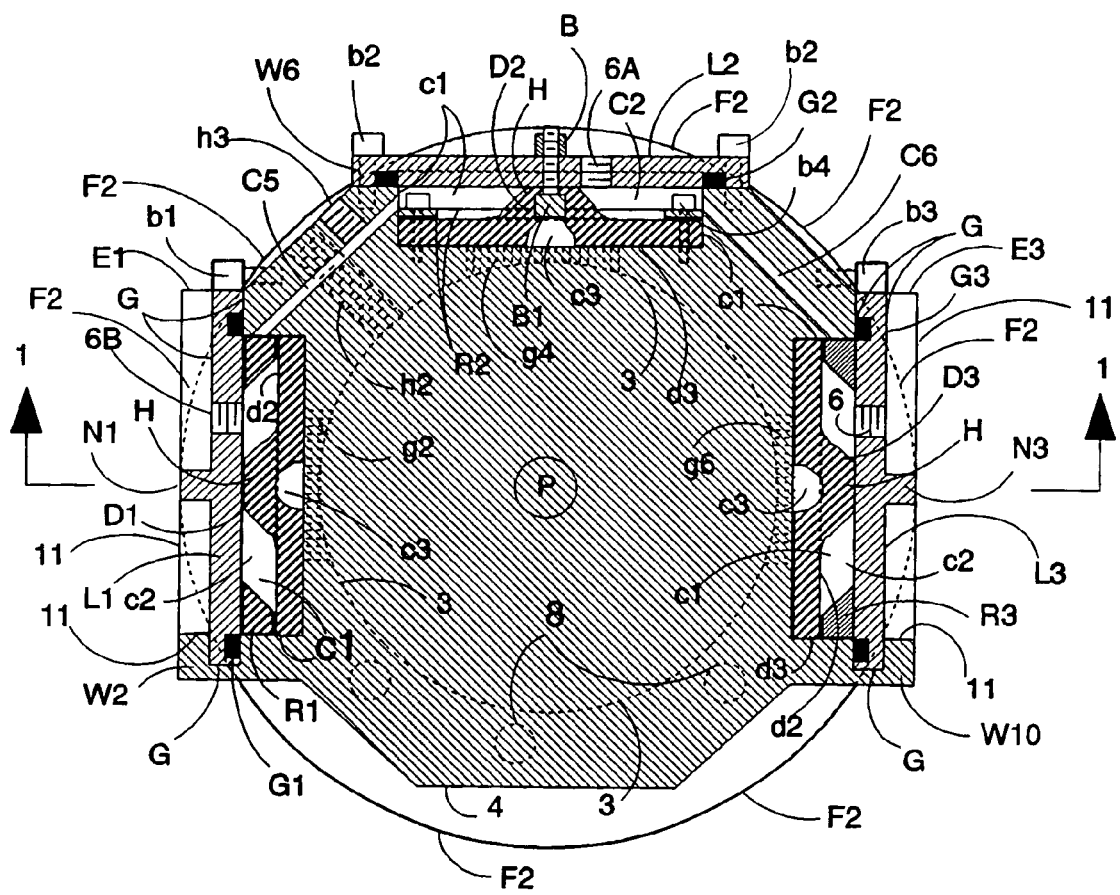

This application claims the benefit of Provisional Application Ser. No. 60/592,957, filed Jul. 31, 2004.

BACKGROUND OF THE INVENTION

1. Field

The invention is in the field of flow control and pressure reducing, pressure relief and check valves for controlling the flow of fluid through the pipe by means of elastomeric flow control flat hat diaphragms.

2. State of the Art

The valves currently in use to control the flow of fluid through pipe lines and to reduce the pressure of fluid in pipe lines, use elastomeric diaphragms having the form of a bladder, which bladder may have the form of a truncated cone having a dead end on the narrow side of said cone and an open end on the opposite side. When the valve is opened fully, the truncated cone diaphragm produces the height of the stroke, which is typically equal to approximately the height of the diaphragm itself. The inventor used elastomeric diaphragms having the above mentioned form in the receptacles around the circular body of the valve in U.S. Pat. No. 4,967,793 invented by the inventor.

The invented elastomeric diaphragm used in this invention has already been used in the invention by the inventor in a patent application Ser. No. 10/636,106 (issued as U.S. Pat. No. 6,834,675 B1) under the name of Cage Valve, where the elastomeric diaphragm is fitted over a seat constructed in a rotatable tube receptacle. The Cage Valve can be fitted with only one or two elastomeric diaphragms, in two opposite receptacles constructed in a rotatable tube, and no more.

Thus the object of this invention is to enhance the capacity of the valve by increasing the number of elastomeric diaphragms placed in the outer receptacles constructed next to each other around the body of the valve having preferably polygonic geometry.

An other object of this invention is to reduce the cost of manufacturing of the elastomeric diaphragms used in the radial cavities around a valve having outer circular or polygonic geometry as shown in U.S. Pat. No. 4,967,793.

An other purpose of this invention is to provide a fluidly balanced cover (lid) to cover the outer opening of the receptacle, without holding it down by means of bolts. This provides a reduction in valve size, and therefore of manufacturing cost, and also greatly enhances the ease of installation and replacement of the valve's diaphragm.

SUMMARY OF THE INVENTION

According to the invention, the Polyvalve is a polygon flow control and pressure reducing valve including an outer body, with said outer body preferably having a polygonic geometry. The polygon may be regular or irregular. The valve body, preferably machined or cast as a single piece, has an inlet chamber and an outlet chamber, and a partition means P that is preferably integrally constructed with the valve body. The inlet chamber and the outlet chamber are preferably comprised of a central bore divided by the partition means P, where said partition means P preferably takes the form of a wall or plate extending perpendicularly to the axis of the central bore.

A plurality of passages are formed in the valve body spaced circumferentially around the partition means and extending through the valve body around the partition means from the inlet chamber to the outlet chamber. Each passage has a circular inlet portion opening into the inlet chamber, adjacent and a distance away from one face of the partition means, and a circular outlet portion opening into the outlet chamber adjacent and a distance away from the other face of the partition means. In addition to extending between the inlet and outlet chambers, the passages preferably also extend radially through the valve body to form an outside passage access opening on the outside surface of the valve body, where the inner most portion of access opening is preferably of the form of a radial cylinder and an outermost portion of that radial access opening is preferably square or rectangular. It is equally practical to construct the entire passage access opening in the form of a cylinder. The passages serve as receptacles for flow control means, and the radial portion of the passage in which the flow control means is positioned is preferably of cylindrical form.

The elastomeric flow control means where, each flow control means has the shape of a flat hat with crown in the middle portion and flat brim border in the outer portion, are positioned in the passages and are responsive to the pressurized fluid introduced around the flow control means to controllably restrict the passage. The passage is closed by the control means, when said control means extends across the passage inlet and passage outlet portions of the valve, and seats against its seat, thereby blocking the passage to prevent fluid flow therethrough. In another position, the flow control means is operated so that it is displaced from the portion of its seat, to clear the passage and to allow fluid flow around the partition means. Whether the flow control means is in the closed position or whether it is in the open position, there is always fluid in and under the pocket of the crown of the elastomeric flow control. The space the control means clears above its seat determines the size of the flow passage, and the volume of fluid allowed to flow around the partition means.

The flow control means is a diaphragm with the shape of a circular flat hat made of elastomeric material. Henceforth, the term "flow control means" and the word "diaphragm" will be considered to be equivalent in meaning. Said control means is secured to the bottom of valve cavity c1, within which it is situated. One method of securing said control means to said valve cavity is to provide the portion of said flow control means near its outermost periphery with an integral protruding border, with said border having radially inward and tangentially outward slanting inclines relative to the center of said diaphragm, and with said integrally protruding border itself acting as the means of holding the outer portion of said flow control means against the bottom of valve cavity c1. Said integral protruding border will also act as a seal to prevent the fluid from exiting the receptacle cavity which contains it. Another method of securing said control means to said valve cavity c1 is through the use of a metallic ring, or ring vulcanized to the outer peripheral brim portion of the flow control means, or ring embedded within said outer peripheral portion, where said ring is used to tie down said control means against the floor of cavity c1 by means of bolts driven through a plurality of openings in said ring, into the floor of cavity c1, where said floor functions as the seat over which the control means is installed.

Each elastomeric flow control means is covered, and kept within its respective cavity receptacle, by a fluidly balanced cover. Said cover preferably takes the shape of a rectangular lid. Each said cover may be slid into corresponding internal grooves constructed into each inner face of each wall of each receptacle, for cover installation, thereby covering cavity c1 of said receptacle. Each said cover may also be slid out of said internal grooves of each receptacle, for cover removal, thereby uncovering cavity c1 of said receptacle. The slidable (drawer) cover can be made to slide out of the grooves by means of a handle, or by any other suitable means of engagement by the user. When all said fluidly balanced covers are installed, they, as a group, can be preferably situated so that their centers are tangents to a common circle. In this case, each said cover can be drawn out of its receptacle, by sliding it tangentially to said common circle. Another alternative to providing covers (lids) for said cavity receptacle (though not the main purpose of this invention), is to secure lids over each receptacle by means of bolts driven into the body of the valve through a plurality of openings near the border of each said lid. Said lids could be circular or rectangular, as could the respective receptacle openings which they cover. The means to pressurize the flow control means are provided which may take the form of a connector for connection to the source of pressurized fluid.

The pressurized fluid to operate said flow control means is supplied through the body of the valve, but the source of pressurized fluid can be an external source different and outside the pipe line, and the valve. It is understood that the actual control of the valve is carried out with various well known conventional control means, such as pilot and needle valve.

THE DRAWINGS

Figure 2:
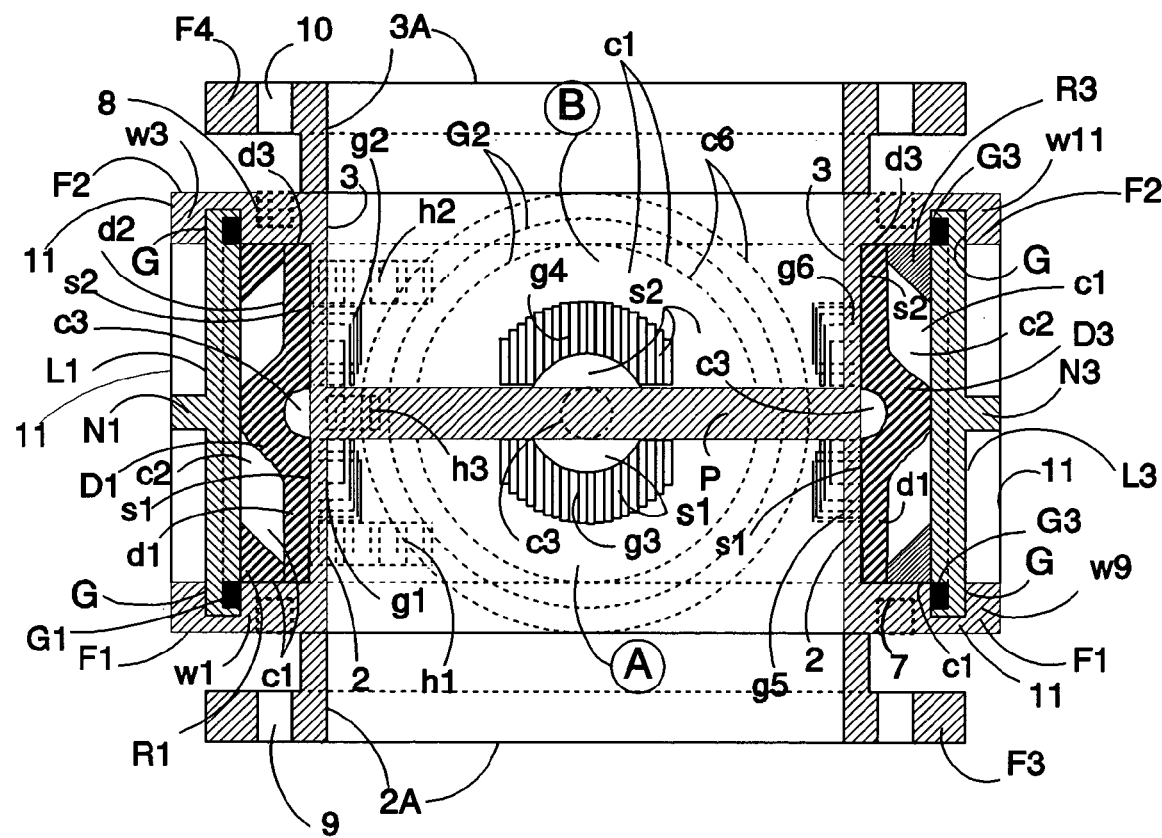

In the accompanying drawings, which illustrate the best mode presently contemplated for carrying out the invention:

FIG. 1 is a transverse vertical section through the center of a valve of the invention;

FIG. 2 an axial vertical section taken on line 1—1 of FIG. 1.

DETAILED DESCRIPTION OF THE ILLUSTRATED EMBODIMENT

Both FIG. 1 and FIG. 2 will be studied simultaneously. It is pointed out that drawings are not drawn to any particular scale. For clarity bolts, B, b2 and b4 shown in FIG. 1 are not depicted in FIG. 2. FIG. 1 shows a polygon valve having three receptacles fitted with three elastomeric control means D1, D2 and D3.

The bottom walls of the two recepticals situated opposite each other, on the left and right sides of the valve of FIG. 1 are shown by W2 and W10, and the two remaining side walls of those receptacles are shown in FIG. 2 by w1, w3; and w9 and w11 respectively.

Flow control means are held inside of the cavities c1. The cavities c1 are created by enclosing space inside the receptacles by cover means L1 and L3 (made out of flat plate) by mounting slidable cover means L1 and L3 into the corresponding grooves G constructed in the inner faces of the walls of the receptacles. Cover means L1 and L3 are provided with centrally constructed protuberant handles N1 and N3 to be useful in mounting the covers in to grooves G from the opening sides E1 and E3 of the receptacles, and to be useful in drawing out the covers from grooves G provided in the walls of the receptacles. Protrusions N1 and N3 can be constructed in any shape, including as handles for human grip, and may protrude from anywhere on the exposed, outer face of the cover, including toward the cover's edge. Screw bolt means b1 and b3 are provided to restrict the slippage movement of the covers L1 and L3 out of groove G. The gasket sealing means G1 and G3 are mounted inside the corresponding grooves inside the body of the cover to prevent leakage of fluid out off the valve body. The elastomeric flow control means D1 and D3 mounted inside the receptacles have the form of a flat hat. For very small flow through the valve body only one receptacle fitted with one flow control means may be needed, and for large flows more than one receptacles fitted with corresponding flow control means can be provided. Each flow control means has crown H (which is preferably in touch with the cover of the receptacle) which divides the cavity c1 of the receptacle into two cavities c2 and c3. The flat brim border in the outer portion of diaphragm D1 covers the inlet passages g1 in inlet chamber A, and also covers the outlet passages g2 in outlet chamber B. The flat brim border in the outer portion of diaphragm D3 covers the inlet passages g5 in inlet chamber A, and also covers the outlet passages g6 in outlet chamber B. The outer border of the flat portion of the hat flow control means is indicated by d3. The center of cavity c3 is situated over the center of the partition wall P. In FIG. 2, a cylindrical inlet chamber and outlet chamber are depicted by A and B respectively. The cylindrical surfaces of chambers A and B are shown by 2 and 3. In FIG. 1 and FIG. 2, the inlet passages to cavities c1 are shown by grate openings g1, g3 and g5 and outlet opening passages for fluid flow between chamber B and cavities c1 are shown by grate openings g2, g4 and g6. The grate openings can be of different geometric configuration and size. The seats provided by the inlet chamber A for the elastomeric flow control means are shown by s1, and the seats provided by the outlet chamber B for elastomeric flow control means are depicted by s2.

D1 shown in FIG. 1, is depicted with a circular elastomeric border ring R1 having an inward incline (or it may have no incline) which is provided to maintain the shape of the border d3 of the flow control means D1. In another alternative, D3 is depicted with a ring R3 provided, which is made of metallic or plastic material to keep the border d3 of D3 tied in place. Rings R1 and R3 may be glued to D1 and D3 or kept free.

Openings 6 and 6B are not shown in FIG. 2 but may be positioned at any suitable location in the cover body. The cavities c1 are connected by means of ducts c5 and c6 for the passage of fluid. To keep the cavities C1 fluidly communicative, cuts (not shown) in R1 and R3 corresponding to end openings of C5 and C6 will be provided. Thus, much of the conventional external tubing to fluidly connect the flow control means in receptacles is eliminated. To operate the valve, upstream threaded opening h1 accesses inlet fluid from inlet chamber A and it is connected to a needle valve (not shown), and the needle valve is connected to threaded opening h3 (emerging from duct C5) and to a pilot valve (not shown), and pilot valve, having two way flow, is connected to threaded opening h2 which opens down stream into chamber B. Threaded opening h1 receives fluid from inlet chamber A and threaded opening h2 is connected to the outlet chamber B, and the middle opening h3 opens into duct C5. If ducts C5 and C6 and h3 are not provided, then threaded openings 6 and 6B in covers L3 and L1 are provided, and they are externally connected with tubes (not shown), where at least one link of those tubes is connected to the said needle valve which is connected to h1, and said needle valve is further connected to a said pilot valve, which is connected to h2 as stated previously. Thus the valve can be modulated as a pressure reducing valve. When fluid from c2 is discharged, the valve opens, and when the cavity c2 is fully charged with pressurized fluid the valve closes; where cavity c3 always remains charged with the fluid from the pipe line. It is further understood that, for maintenance, a shutoff valve upstream from the needle valve, and a shutoff valve downstream from the pilot valve, will be provided to isolate the flow control means from fluid from inlet h1 and outlet h2. It is further understood that to isolate the valve, to replace flow control means, two shutoff valves; one upstream from the valve and the second downstream from the valve, will be provided.

Compared with the depictions of the left and right recepticals of FIG. 1, containing diaphragms D1 and D3, the depiction of the top receptical in FIG. 1, containing diaphragm D2, shows an alternative means of securing a diaphragm in the receptacle and also an alternative means of securing a cover over a receptacle. (Regardless of this alternate depiction, it is understood that all receptacle in the valve body can be made the same, including the means to secure the diaphragms and receptacle covers.) The flow control means D2 is tied to its seat by means of ring R2 and by a plurality of bolts b4. The ring may be vulcanized to the radially outermost portion of diaphragm D2 or embedded inside said portion of D2. An optional bolt B1 with a nut B is provided to hold crown H of D2 in place. Aside from these differences in this said alternate depiction, all of the functionality, and all of the above description of means thereof, relating to the left and right receptacles of FIGS. 1 and 2, containing diaphragms D1 and D3, respectively, also applies to the top receptacles of FIG. 1 and its diaphragm D2.

There are two alternatives to connect the valve to the inlet and outlet pipes(not shown) where said pipe are provided with flanges. In the first alternative, the inlet and the outlet faces of the valve body are made to function as flanges F1 and F2, where flange F1 is attached to the flange of a inlet pipe (not shown) by means of screw bolts (not shown) and flange F2 is attached to the flange of outlet pipe (not shown) by means of screw bolts (not shown). The screw bolts are driven into threaded bolt holes depicted by 7 and 8, which bolt holes are situated in a bolt circle in each flange F1 and F2. In the second alternative flanges F3 and F4 are separated from the main valve body by providing extensions 2A and 3A to chambers A and B. Flanges F3 and F4 are provided bolt circle openings 9 and 10 respectively. F3 is attached to the flange of a inlet pipe (not shown) and flange F4 is attached to the flange of outlet pipe (not shown). FIGS. 1 and 2 have been drawn to include this second alternative. It is understood that valve can function as a check valve, without any needle or pilot valve, by merely connecting a cavity or cavities c2 with outlet opening h2.

Whereas the invention is illustrated and described here with references to embodiment thereof presently contemplated as the best mode of carrying invention in actual practice, it is to be understood that various changes may be made in adapting the invention to different embodiments, and different types of coupling means may be adopted to connect the valve to the pipes without departing from the broader inventive concept disclosed herein and comprehended by the claims that follow.

I claim:

1. A flow control and pressure reducing valve, comprising:
    a valve body, having an outer body of a polygonic geometry, having an inlet chamber and an outlet chamber therein;
    a centrally constructed partition means P creating an inlet chamber and an outlet chamber;
    a plurality of receptacles in the valve body, with each such receptical containing flow control means where, each flow control means has the shape of a flat hat with crown in the middle portion and flat brim border in the outer portion, and with each said receptacle beginning from outside the valve body to act as an access opening into the valve, and walls of said access opening extending inwardly through the valve body, to said partition means, and also extending inwardly and opening, through openings through a grating, into both the inlet and outlet chambers of the valve, and where each said flow control means is placed in each said receptacle from outside the valve body, through said access opening, and where each receptacle is a passage means extending through the valve body from the inlet chamber to the outlet chamber around the partition means;
    means to supply pressurized fluid to said flow control means to control and to restrict each of said passage means to thereby control flow of fluid through the valve;
    means for covering, configured to fit grooves inside of the walls of said receptacles;
    means to seal said access openings;
    means to attach the valve to inlet pipe and outlet pipe.

2. A flow control and pressure reducing valve according to
    claim 1, where each passage means is divided equally into inlet and outlet portions by partition means P.

3. A flow control and pressure reducing valve according to claim 1, wherein cavity c2, around the crown in the middle portion of each flow control means, is charged with pressurized fluid to control the flow of fluid, through the passage means in the inlet chamber to the passage means in the outlet chamber, around said partition means.

4. A flow control and pressure reducing valve according to claim 2, wherein center of cavity c3, contained under crown H of each flow control means, is situated over partition means P, which remains charged with fluid from the pipe line whether the valve is closed shut or whether it is open to allow fluid flow through the valve.

5. A flow control and pressure reducing valve according to claim 1, wherein means to supply pressurized fluid to said flow control means to control and to restrict each of said passage means, to thereby control flow of fluid through the valve are externally located needle and pilot valves.

6. A flow control and pressure reducing valve according to claim 1, wherein at least one receptacle fitted with said flow control means is provided.

7. A flow control and pressure reducing valve according to claim 1, wherein means for covering and sealing said access opening is a drawer cover made of a flat plate mounted inside of the groove constructed into the inner faces of the walls of receptacle.

8. A flow control and pressure reducing valve according to claim 7, wherein means for covering the said access opening is a drawer cover made from a flat plate provided with a groove to hold a gasket sealing means to prevent the leakage of fluid from the receptacle.

9. A flow control and pressure reducing valve according to claim 8, wherein means for covering the said access opening is a drawer cover made from a flat plate provided with a protuberant handle used to mount said drawer cover into the groove, and to dismount the drawer cover from the groove, inside the receptacle.

10. A flow control and pressure reducing valve according to claim 9, wherein said drawer cover is restricted by a restriction means, to prevent its slippage movement out of said groove.

11. A flow control and pressure reducing valve according to claim 9, wherein each drawer cover for a receptacle is mounted or dismounted by moving said cover tangentially to a common circle.

12. A flow control and pressure reducing valve according to claim 10, wherein said restriction means is at least a one bolt driven into the valve body situated against the cover.

* * * * *